United States Patent [19]

Bogle et al.

[11] Patent Number: 4,571,175
[45] Date of Patent: Feb. 18, 1986

[54] PROCESS FOR A DISPOSAL OF WASTE SOLUTIONS

[75] Inventors: Hugh A. Bogle, Sarasota, Fla.; Charles E. Buchanan, Nazareth, Pa.

[73] Assignee: Roan Industries, Inc., Bath, Pa.

[21] Appl. No.: 728,284

[22] Filed: Apr. 29, 1985

[51] Int. Cl.⁴ .......................... F27B 15/00; F23G 7/04
[52] U.S. Cl. ..................................... 432/14; 110/228; 110/238; 110/224
[58] Field of Search ............... 110/238, 220, 226, 215, 110/238, 222, 224, 347; 432/106, 14

[56] References Cited

U.S. PATENT DOCUMENTS

| | | | |
|---|---|---|---|
| 3,518,774 | 7/1970 | Reimer | 110/228 |
| 3,601,070 | 8/1971 | Lambiris | 110/238 |
| 3,707,129 | 12/1972 | Kawashimo et al. | 110/228 |
| 3,848,548 | 11/1974 | Bolejack et al. | 110/220 |
| 3,985,086 | 10/1976 | DeTola | 110/224 |
| 4,059,060 | 11/1977 | Gambs et al. | 110/228 |
| 4,236,886 | 12/1980 | Ansen et al. | 432/14 |
| 4,310,298 | 1/1982 | Abelitis | 432/14 |
| 4,466,362 | 8/1984 | Maxwell et al. | 110/347 |
| 4,486,959 | 12/1984 | Chang | 110/224 |
| 4,499,833 | 2/1985 | Grantham | 110/238 |

Primary Examiner—Henry C. Yuen
Attorney, Agent, or Firm—Dann, Dorfman, Herrell and Skillman

[57] ABSTRACT

A method of disposing of aqueous waste in which the aqueous waste is mixed with cement raw materials to form a slurry for the preparation of Portland cement or the like, for example in a rotary kiln. Prior to forming the slurry, the aqueous waste is treated to remove volatiles and other pollutants which vaporize when heated to a temperature below the boiling point of water. Such volatile materials are removed by contacting the aqueous waste with the effluent exhaust gases from the kiln itself and with the effluent air from the clinker cooler with suitable controls to avoid loss of the water component of the aqueous waste through boiling. The treated aqueous waste is then embodied in the slurry fed to the kiln and the pollutants in the water which can be combusted by the high temperature in the kiln are destroyed. The gaseous effluent which is cooled by contact with the aqueous waste may be discharged or further treated to recover the volatiles and other components which may be salvaged.

10 Claims, 1 Drawing Figure

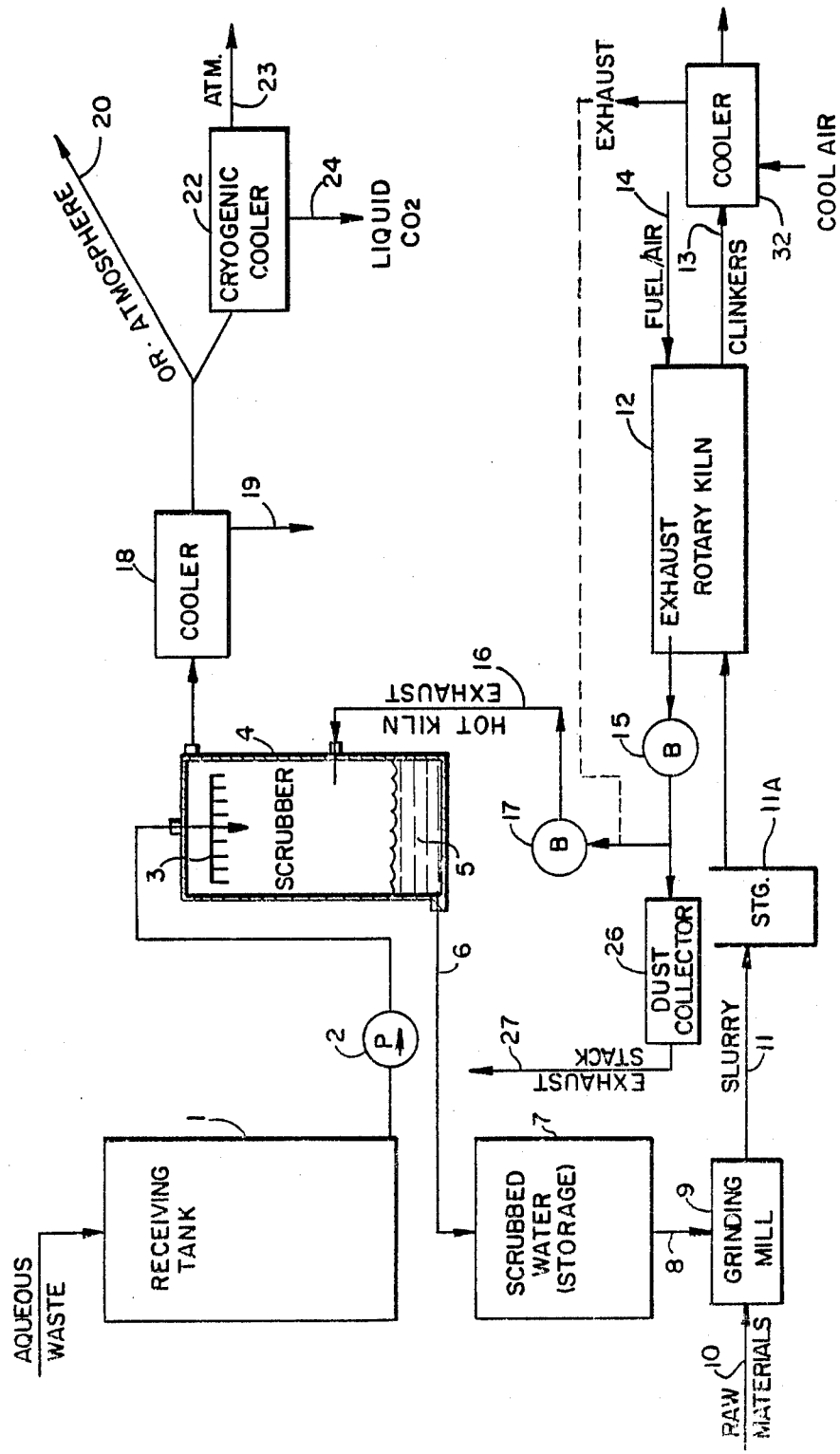

PROCESS FOR A DISPOSAL OF WASTE SOLUTIONS

FIELD OF THE INVENTION

The present invention relates to disposal of industrial wastes, and more specifically to the disposal of aqueous waste.

BACKGROUND OF THE INVENTION

Disposal of aqueous waste is a costly and bothersome problem. Many methods of disposal which are desirable from a cost standpoint are unacceptable from the standpoint of safety to the environment. The present invention is directed towards a process of disposing of waste materials, particularly organic or chemical aqueous waste, in a manner which is both cost efficient as well as safe to the environment.

It is not unusual for a very large amount of waste solution to require disposal. These waste materials are the by-products of various chemical processes, including the preparation or synthesis of chemical compounds and can be residual (not hazardous) or toxic or result in the formation of toxic by-products. The presence of these pollutants in the aqueous waste solutions prohibit their disposal in streams or other aquifers, and burial of these materials underground is of questionable safety. Likewise, disposal of odoriferous wastes may be difficult because of the pollution of the atmosphere.

The present invention contemplates the treatment of a wide variety of aqueous wastes. The combustible materials present as pollutants in the aqueous waste may consist of a dissolved or dissociated solid, i.e. a sugar or a salt, a solid material dispersed in the aqueous solution, i.e. starch, an organic compound, i.e. an alcohol or a glycol, or an inorganic substance, i.e. fumed silica. One example of a waste solution is brewery waste which not only includes ethyl alcohol, but also is extremely odoriferous because of the yeast, malt and alcohol contained in it.

In the past, disposal of aqueous wastes has been accomplished in a variety of ways. Disposal by dumping onto the land or into streams or other aquifers is no longer tolerated by our society. One alternative has been to treat the aqueous wastes in sewage treatment plants. Since many of these aqueous wastes contain toxic materials, the solutions require extensive pretreatments to remove the toxic pollutants before the solutions can be treated in a conventional sewage treatment plant. This method has suffered from a number of drawbacks. Primarily, such pretreatment is extremely expensive. Secondly, many sewage treatment facilities do not have sufficient capacity to carry out the necessary treatment on large quantities of toxic waste materials.

Non-aqueous wastes have been combined with the fuel fed to a kiln to effect combustion of the wastes, but the water content of the aqueous wastes renders this procedure inappropriate for disposal of aqueous waste. It has been attempted to dispose of such waste solutions by employing the solutions as the liquid component of a slurry being fed to a Portland cement kiln. The solid component of the slurry is comprised of cement raw materials, such as clay, sand, or stone. The solid and liquid components of the slurry are ground to form the finely ground slurry, which is then burned in the Portland cement kiln. Normally, clean water is employed as the liquid component of the slurry. By replacing the clean water normally used in the slurry with aqueous waste, the toxic materials and other combustible pollutants which are present in the waste solution are fed to the cement kiln where they are burned at a temperature sufficiently great to decompose the pollutants and toxic materials. This procedure, though desirable from a cost efficiency standpoint, has suffered from a major disadvantage. The waste solutions being treated often contain at least a portion of pollutants which are volatile at temperatures considerably less than the operating temperature of the kiln or the temperature at which the volatile pollutants are decomposed. When these volatile pollutants are present in the feed slurry entering the cement kiln, these volatile components can be vaporized by the effluent stream within the cement kiln before the feed reaches a point in the kiln where decomposition occurs. The effluent stream from the kiln can therefore contain vaporized pollutants which may constitute an explosive hazard in the duct work, fans, collector or the stack, and which are also in the effluent stream leaving the kiln to be expelled into the atmosphere. For this reason, the gaseous effluent from the cement kiln apparatus containing these pollutants has not met the approval of the regulatory agencies.

SUMMARY OF THE INVENTION

In accordance with the present invention, a method is disclosed whereby aqueous waste solutions are disposed of in a cost-effective and safe manner. The present invention constitutes an improvement over the above-discussed prior art method of employing waste solutions as the liquid component of a slurry being supplied to a Portland cement kiln. In the present process, a waste solution is employed as the liquid component of a cement slurry while avoiding the aforementioned disadvantages.

The invention comprises contacting the aqueous waste material to be employed in the slurry with exhaust gases from the cement kiln apparatus, from the kiln itself and/or from the clinker cooler associated with the kiln, this contact being made prior to mixing the waste solution with the cement raw materials to form the slurry. This contact removes the low-boiling volatile pollutants from the waste solution. The liquid waste solution which is introduced into the slurry with the cement raw materials is thus free of low-boiling volatile pollutants. Accordingly, the slurry entering the cement kiln is also free of these low-boiling pollutants, and the problem of pollutant build-up in the kiln effluent stream is obviated. Furthermore, the effluent from the cement kiln apparatus into the atmosphere is free of vaporized volatile pollutants.

Contact between the aqueous waste solution and the effluent gas from the cement kiln occurs in a contact vessel. Inside the vessel, the volatile pollutants present in the aqueous waste are vaporized and become part of the gaseous phase. This gaseous phase, which comprises exhaust gases from the cement kiln and/or the exhaust air from the clinker cooler and the volatile pollutants entrained therein, is withdrawn from the contact vessel and cooled. The volatile materials present in the gaseous phase are condensed at this point, and the remaining gaseous effluent, consisting principally of nitrogen and carbon dioxide, can be safely discharged into the atmosphere or salvaged as the case may be.

DESCRIPTION OF THE DRAWING

The FIGURE is schematic flow diagram showing the stages employed in the preferred embodiment of the process of the present invention.

DESCRIPTION OF THE PREFERRED EMBODIMENT

The preferred embodiment of the present process will now be explained in detail with reference to the FIGURE.

A supply of fresh (untreated) aqueous waste is received in a tank 1, sampled, and analyzed to determine what materials are present in the receiving tank 1. Fresh aqueous waste is then carried for example by a pump 2 from the receiving tank to a contact vessel, in the present instance a scrubber 4. Within the contact vessel, the aqueous waste material is contacted with a flow of hot effluent exhaust gas from a rotary kiln 12 and/or from a clinker cooler 32 which comprises a part of the kiln apparatus. The effluent from the kiln 12 is blown into the contact vessel 4 by a blower 17 and a conduit 16. Exhausted air from the cooler 32 may be mixed with the fuel for the kiln or may be fed directly to the contact vessel 4. The contact vessel may be a heat exchanger, a packed column or a spray column preferably with a demister or other similar device. In the illustrated preferred embodiment, the contact vessel is a scrubber, having nozzles 3 located in the upper part thereof. The nozzles 3 direct the flow of fresh aqueous waste in a downwardly direction as a fine stream. The downwardly directed aqueous waste is contacted by an upwardly directed flow of hot exhaust gases which enter the lower portion of the heat exchanger. By contacting the liquid and the gas countercurrently, maximum contact between the phases is assured. When the hot gases contact the aqueous waste, the volatile components of the aqueous waste are vaporized and enter the gaseous phase within the contact vessel. The remaining aqueous waste is collected as a liquid in the bottom of the contact vessel, as indicated at 5.

The term volatile pollutants within the meaning of the present discussion refers generally to components having a boiling point lower than the boiling point of water, i.e. 212° F., but may include any component whose vaporization temperature is lower than the temperature of the gaseous phase leaving the contact vessel 4. For this reason, the volume of exhaust gases which enter the contact zone should be controlled so that they are cooled to a temperature such that only the components of the waste solution having a boiling point lower than 212° F. are vaporized, but maintained at a sufficiently high temperature to vaporize the volatiles. Otherwise, the water itself within the waste solution would also be vaporized. This would be unacceptable in that it is desired to maintain an aqueous solution for use in the cement kiln slurry. Control of the temperatures in the scrubber is effected by controlling the flow of the waste solution through the sprays 3 in relation to the flow of gaseous effluents from the kiln, as set forth below.

The volatile-free aqueous solution is then discharged from the contact vessel by way of line 6 and directed to storage tank 7. From storage tank 7, a desired quantity of the volatile-free solution is led by way of line 8 to the slurry preparation station 9. Cement raw materials such as stone, clay, sand, etc. are introduced into the slurry-preparation station by way of line 10. The slurry preparation station 9 may comprise a comminuting device, such as a ball mill, which grinds the cement raw materials and the volatile-free aqueous solution to form a fine slurry. The slurry is led by line 11 and storage reservoir 11A into the Portland cement kiln 12. Any type of cement kiln may be used in the present invention, but a rotary kiln is preferred. Generally, the temperature within the rotary kiln 12 is approximately 2,700° F. and may reach as high as 3,000° F. Material leaves the cement kiln in the form of clinkers as shown at 13 and the clinkers are cooled in the cooler 32 so that the clinkers may be ground into finished cement. Fuel is supplied to the kiln in the form of coal, oil, gas or waste solvents as shown at 14. Air introduced with the fuel may be fresh or may include air from the cooler 32. Products of combustion, which consist largely of carbon dioxide, nitrogen, and water vapor, at approximately 500° F., are pulled out by exhaust blower 15. The description of the cement kiln apparatus is abbreviated here, since such kilns are very familiar to one of ordinary skill in the art.

Preferably, the fuel-air mixture fed to the kiln is lean so as to insure maximum fuel efficiency. However, if the aqueous waste contains a high proportion of pollutants which vaporize within the kiln, the mixture may be enriched to assure complete combustion of all of the combustible components introduced with the slurry.

Part of the effluent gas removed from the kiln by way of blower 15 is exhausted to the atmosphere by way of a dust collector 26 to a stack 27. Any selected portion of the effluent leaving the kiln may be withdrawn by blower 17 along with all or part of the exhaust air from the cooler 32, and directed, by way of line 16, to the contact vessel 4 for contact with fresh aqueous waste. The blower 17 controls the flow of effluent through the contact vessel 4 to maintain the temperature of the effluent discharged from the vessel close to 212° F., so that the temperature of the aqueous waste does not exceed its boiling point within the contact vessel 4. Inside the contact vessel, the exhaust effluent from the kiln becomes laden with vaporized, low-boiling volatile pollutants from the aqueous waste, for example, in the case of brewery waste principally ethanol. The contact vessel 4 may include a drop collector at the top to remove entrained water, if desired to reduce the moisture content in the subsequent flow. The gaseous component in the contact vessel is withdrawn from the top of said vessel by way of a cooling zone 18, which may comprise a cooler or the like in which the volatile materials which were vaporized in the contact vessel which are readily condensed are withdrawn as shown at 19. The remaining gaseous effluent, primarily carbon dioxide and nitrogen, can be either vented directly into the atmosphere as shown at line 20, or directed to a cryogenic cooler 22, from which carbon dioxide is removed as a liquid as shown at line 24, and nitrogen is discharged, for example to the atmosphere or to a secondary recovery device, by way of line 23.

The above examples are intended to be illustrative in nature, and not to limit the scope of the invention.

We claim:

1. A method of disposing of aqueous waste having a liquid component, combustible material and pollutants which are volatile below the boiling point of the liquid component by employing said aqueous waste as the liquid component of a cement slurry in a cement kiln apparatus, said method preventing the escape of volatile pollutants into the atmosphere and preventing the buildup gaseous volatile pollutants within the cement kiln, and comprising the steps of:

a. contacting the aqueous waste with hot gaseous effluent from the cement kiln apparatus in a contact vessel to raise the temperature of the aqueous waste to a temperature below the boiling point of the liquid component sufficient to vaporize the volatile pollutants and thereby remove them from the aqueous waste to form a volatile-free waste solution;

b. collecting the volatile-free waste solution;

c. combining the volatile-free waste solution with cement raw materials, and comminuting the resulting mixture to a fine slurry;

d. burning the combustible material in said slurry in the cement kiln apparatus to generate hot gaseous effluent and forming cement clinkers from the raw materials; and e. discharging the hot gaseous effluent from said cement kiln apparatus, and directing at least a portion of said hot gaseous effluent to the contact vessel to accomplish said step of contacting the waste solution with hot gaseous effluent.

2. The method of claim 1 including the additional steps of discharging the hot gaseous effluent and vaporized pollutants from the contact vessel and condensing the volatile pollutants therefrom.

3. The method of claim 1 wherein said contacting the aqueous waste with the hot gaseous effluent from the cement kiln is accomplished by directing a fine spray of the aqueous waste counter-currently to a flow of said hot gaseous effluent within said contact vessel.

4. The method of claim 3 wherein said contact vessel is a heat exchanger, including the step of providing nozzles within said heat exchanger to direct a spray of the aqueous waste in a downwardly direction and directing the flow of said hot gaseous effluent upwardly within said heat exchanger.

5. The method of claim 4 including the step of collecting the volatile-free waste solution in the bottom of said heat exchanger.

6. The method of claim 1 including the step of grinding said volatile-free waste solution and said cement raw materials together in a mill to form said fine slurry.

7. The method of claim 1 including the step of providing a fuel-air mixture to the cement kiln apparatus and controlling the mixture to cause the kiln apparatus to subject the slurry to a temperature between 2700° F. and 3000° F.

8. The method of claim 1 including the step of controlling the flow of said hot gaseous effluent into the contact vessel so as to maintain the temperature of the gaseous effluent in the vessel after contacting the aqueous waste below the boiling point of the liquid component of the aqueous waste within the vessel and to maintain the temperature of the aqueous waste when it first contracts the hot gaseous effluent below the boiling point of its liquid component.

9. The method of claim 1 wherein the aqueous waste is brewery waste and the volatile pollutant comprises ethanol.

10. The method of claim 1 wherein the clinkers formed by burning the material in the kiln apparatus are cooled in a cooler by air, and including the step of including the air exhausted from said cooler in said gaseous effluent from the kiln apparatus.

* * * * *